(12) United States Patent
Hansen et al.

(10) Patent No.: US 11,648,691 B2
(45) Date of Patent: May 16, 2023

(54) ADAPTIVE TOOLING INTERFACE

(71) Applicant: Oceaneering International, Inc., Houston, TX (US)

(72) Inventors: Charles B. Hansen, Bryne (NO); Torleif Carlsen, Sandnes (NO)

(73) Assignee: Oceaneering International, Inc., Houston, TX (US)

( * ) Notice: Subject to any disclaimer, the term of this patent is extended or adjusted under 35 U.S.C. 154(b) by 229 days.

(21) Appl. No.: 16/254,293

(22) Filed: Jan. 22, 2019

(65) Prior Publication Data

US 2019/0224858 A1     Jul. 25, 2019

Related U.S. Application Data

(60) Provisional application No. 62/620,150, filed on Jan. 22, 2018.

(51) Int. Cl.
| | |
|---|---|
| *B25J 15/04* | (2006.01) |
| *B25J 9/00* | (2006.01) |
| *B63G 8/00* | (2006.01) |
| *B25J 19/00* | (2006.01) |

(52) U.S. Cl.
CPC ......... *B25J 15/0408* (2013.01); *B25J 9/0009* (2013.01); *B25J 19/0033* (2013.01); *B63G 8/001* (2013.01); *B63G 2008/002* (2013.01)

(58) Field of Classification Search
CPC . B25J 9/0009; B25J 9/0021; B25J 9/08; B25J 15/0408; B25J 15/0416; B25J 19/0008; B25J 19/002; B25J 19/0033; B63B 2035/008; B63C 11/52; B63G 8/001; B63G 2008/002
See application file for complete search history.

(56) References Cited

U.S. PATENT DOCUMENTS

| | | | | |
|---|---|---|---|---|
| 4,645,409 | A | * | 2/1987 | Gorman |
| 4,721,055 | A | * | 1/1988 | Pado |
| 4,793,053 | A | * | 12/1988 | Zuccaro et al. |
| 4,897,014 | A | * | 1/1990 | Tietze |
| 6,269,763 | B1 | * | 8/2001 | Woodland ............... A62C 29/00 114/144 A |
| 10,286,566 | B2 | * | 5/2019 | Williams |
| 2009/0233774 | A1 | * | 9/2009 | McCoy, Jr. |
| 2015/0136012 | A1 | * | 5/2015 | Williams ............... B63G 8/001 114/312 |
| 2016/0176043 | A1 | * | 6/2016 | Mishra et al. |
| 2016/0273677 | A1 | * | 9/2016 | Rice .......................... F16L 1/26 |

* cited by examiner

*Primary Examiner* — Dean J Kramer
(74) *Attorney, Agent, or Firm* — Maze IP Law, P.C.

(57) ABSTRACT

An adaptive tooling interface comprises a plurality of motors, disposed at least partially within a housing, which are operatively in communication with a controller and where a first power output is operatively in communication with a first motor of the plurality of motors and a second power output operatively in communication with a second motor of the plurality of motors. A drive interface, comprising a tooling adapter, is operatively in communication with the plurality of motors and configured to mate with and provide power to one or more tools, which comprise a matching subsea tool tooling interface, via the first power output and the second power output. The adaptive tooling interface may be connected to or otherwise integrated into a subsea vehicle system comprising a subsea vehicle.

19 Claims, 9 Drawing Sheets

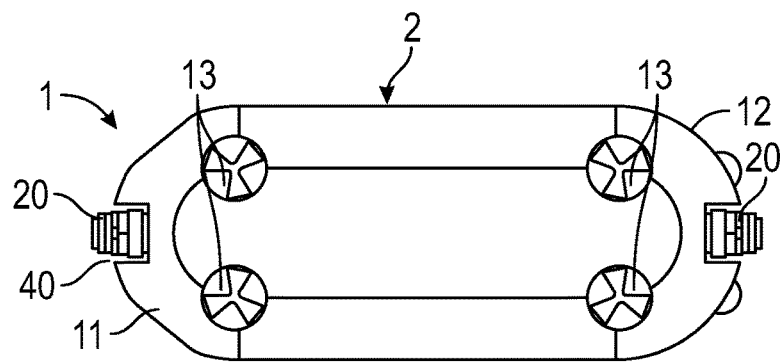
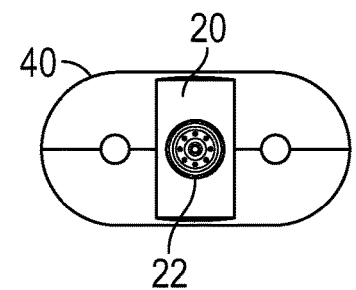
FIG. 13A          FIG. 13B
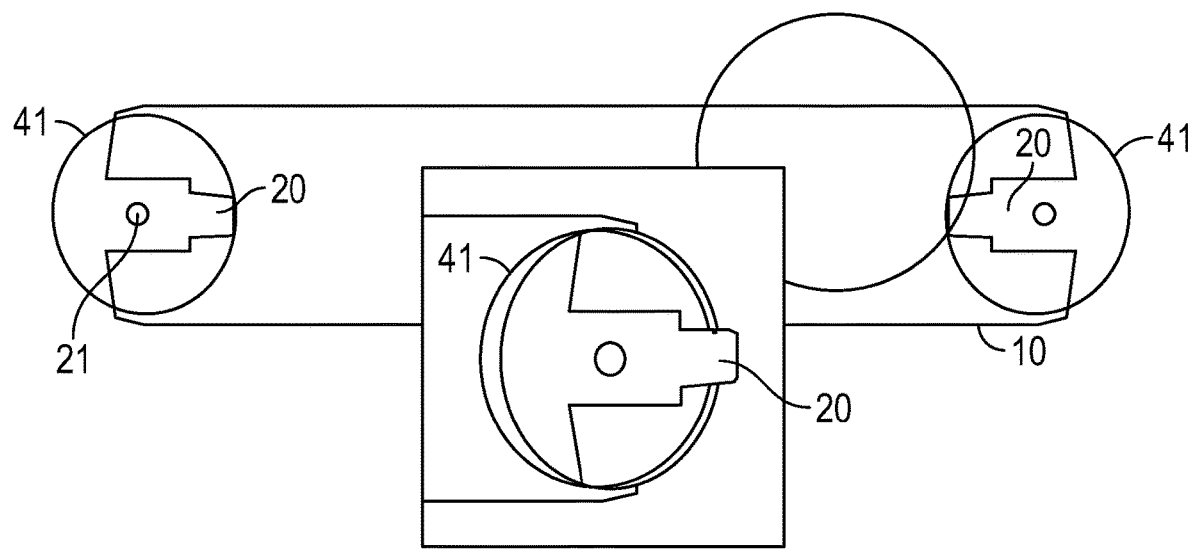
FIG. 14

US 11,648,691 B2

ADAPTIVE TOOLING INTERFACE

RELATION TO OTHER APPLICATIONS

This application claims the benefit of U.S. Provisional Patent Application 62/620,150 titled "Adaptive Tooling Interface" filed on Jan. 22, 2018.

FIELD OF THE INVENTION

Underwater vehicles, such as remotely operated vehicles (ROV) or autonomous underwater vehicles (AUV), have the ability to operate tooling to perform subsea intervention. One of the key underwater vehicle abilities will be to accommodate a versatile tooling interface such as an ROV or AUV tooling interface, in combination with a matching subsea tool tooling interface. These interfaces may be crucial to AUV/ROV performance and a new interface standard may be required ensure future adaptability of upcoming tooling technology.

Further, conventional ROV tools such as an ROV manipulator may not be an optimal tool handling solution on a hydrodynamic vehicle such as a subsea drone. In such cases, a lightweight and versatile unit may be required to reduce the overall power consumption and to increase operational readiness, without compromising vehicle balance as well as reducing tool interface complexity.

FIGURES

The figures supplied herein illustrate various embodiments of the invention.

FIGS. 13A and 13B are a block schematic diagram of an exemplary embodiment of a system incorporating the claimed invention;

FIG. 14 is a block schematic diagram of an exemplary embodiment of the system the claimed invention illustrating a coverl

DESCRIPTION OF VARIOUS EMBODIMENTS

Figure 1:
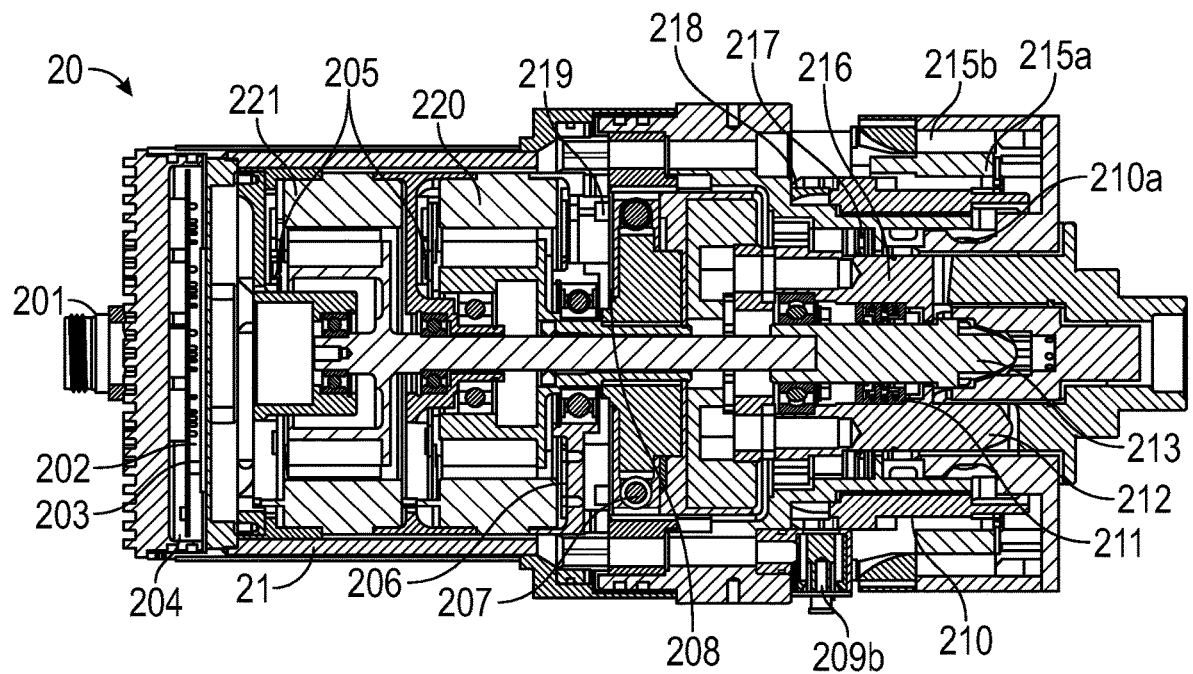
FIG. 1 is a cutaway view in partial perspective of an exemplary embodiment of the claimed invention.
Figure 9:
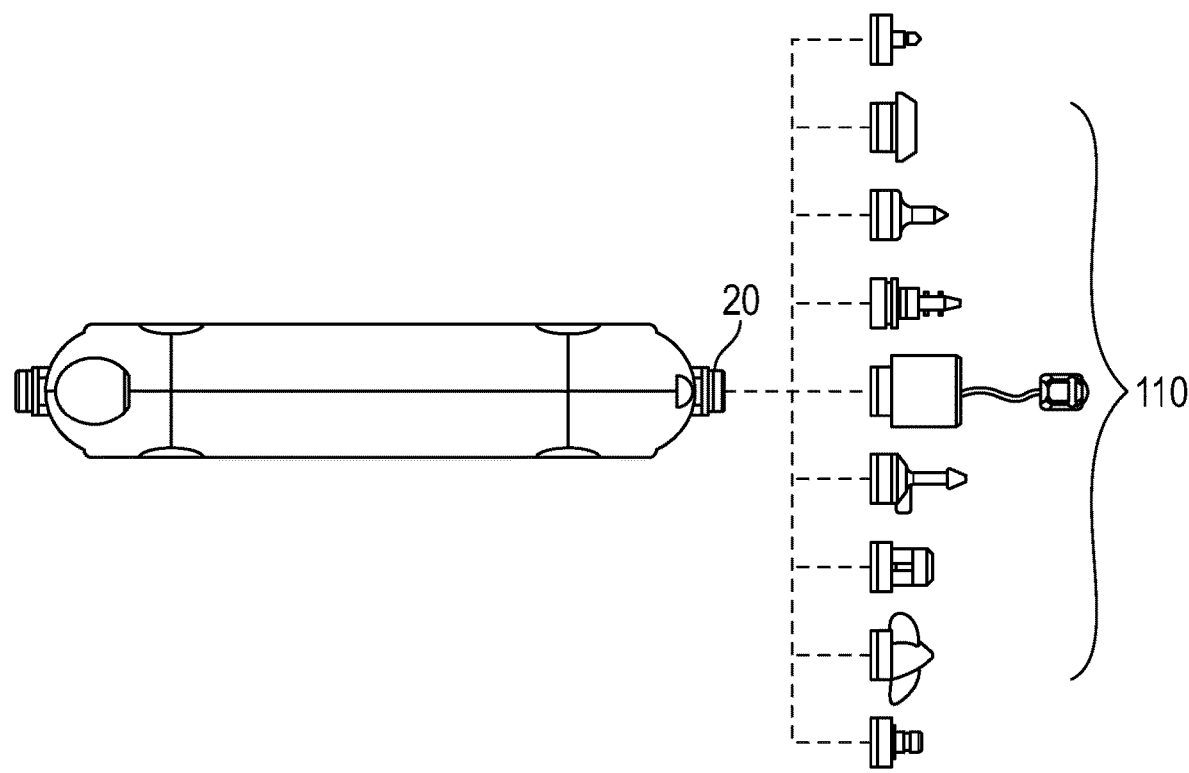
FIG. 9 are a block diagram illustrating various tools to be interfaced with the drive interface of the claimed invention.

Referring to FIG. 1, in a first embodiment adaptive tooling interface 20 comprises housing 21 (FIG. 10); controller 250, which is typically disposed at least partially in housing 21; a plurality of motors 220,221 disposed at least partially, if not completely, in housing 21 and configured to provide power to one or more tools (generally referred to as callout "110" (FIG. 9)) via first power output 213 operatively in communication with first motor 220 and second power output 212 operatively in communication with second motor 221; and drive interface 21c connected to and/or otherwise integrated with housing 21 and comprising tooling adapter 21d operatively in communication with the plurality of motors 220,221 and configured to mate with and provide power via first power output 213 and second power output 212 to one or more tools 110 which comprise a matching subsea tool tooling interface. Housing 21 may be an integrated housing or comprise first housing section 21a and a separate second housing section 21b mated to first housing section 21a.

Figure 3:
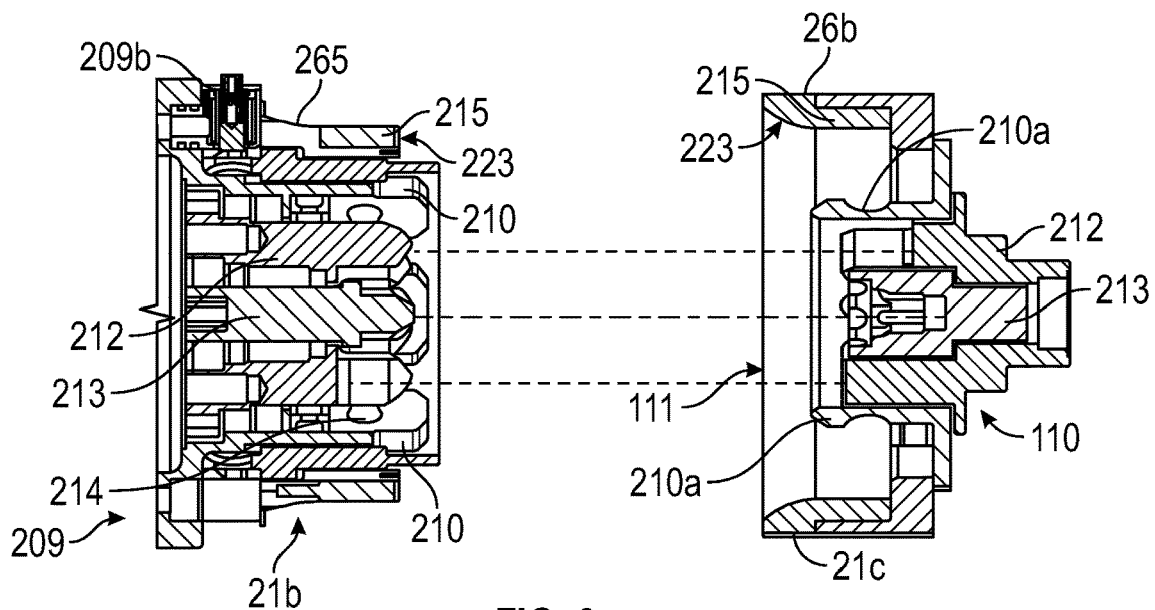
FIG. 3 is a cutaway view in partial perspective of an exemplary embodiment of a drive interface of the claimed invention.

Tool 110 may comprise one or more of a plurality of tools 110 (FIG. 3) such as intervention tools or manipulator jaws 112 (FIG. 8), where each tool 110 comprising a matching subsea tool tooling interface 111 (FIG. 3). Tool 110 may be freestanding or docked to another device such as a subsea underwater drone. For certain embodiments, drive interface 21c comprises a tooling interface for drone subsea tooling needs In various embodiments, as illustrated in FIG. 1, adaptive tooling interface 20 may comprise GA connector 201, EL 202, one or more water alarms 203 and 208, one or more comp barriers 206, sleeve 210, one or more mechanical seals 211, lip seal 217, one or more springs 218, and one or more magnets 219.

In certain embodiments, adaptive tooling interface 20 comprises one or more interfaces 215 (FIG. 3) operatively in communication with controller 250, where each interface 215 may comprise one or more power interfaces 215a which may be an inductive and/or pinless power interface and/or one or more communications interfaces 215b, which may comprise an inductive and/or pinless data communication interface. Power interface 215a and/or communications interface 215b are typically operative to interface with tools 110, sensors, valves, clamps, winches, fixed installations interfaces, other subsea equipment, or the like, or a combination thereof.

In most embodiments, the plurality of motors 220,221 are integrated in an in-line configuration. In certain embodiments one of the motors of the plurality of motors 220,221 comprises a high torque motor and second power output 212 comprises a torque output operatively in communication with the high torque motor. In embodiments, one of the motors of the plurality of motors 220,221 comprises a high speed motor and first power output 213 comprises a speed output operatively in communication with the high speed motor. The plurality of motors 220,221 may further comprise an optimized motor pairing configured to enable adaptive tool interface 20 to supply tooling with increased angular control such as for delicate operation and a large variable speed control with gearing option. One or more position sensors 204, which are typically highly accurate position sensors, and off-axis encoders 205 are disposed on or proximate the motors' individual rotors to provide controller 250 with accurate shaft position. Using this system, high torque position accuracy is even better using harmonic gear 207 with a gear increase for point density, e.g. 120×, if harmonic gear 207 gear ratio is 120:1. Motors 220,221 are typically brushless motors which use controller 250 to ensure high resolution speed control. Controller 250 may further provide torque feedback such as by sensing amperage of the current drawn by motors 220,221 and software operative in controller 250 which uses calibrated reference values to predict output torque.

This optimized motor pairing may comprise first motor 220 comprising a high torque motor, second motor 221 comprising a high speed motor, and controller 250 being configured to adjustably control the plurality of motors 220,221 to allow for lower speed/high torque/fine control operation and/or larger speeds from the plurality of motors 220,221.

Figure 2:
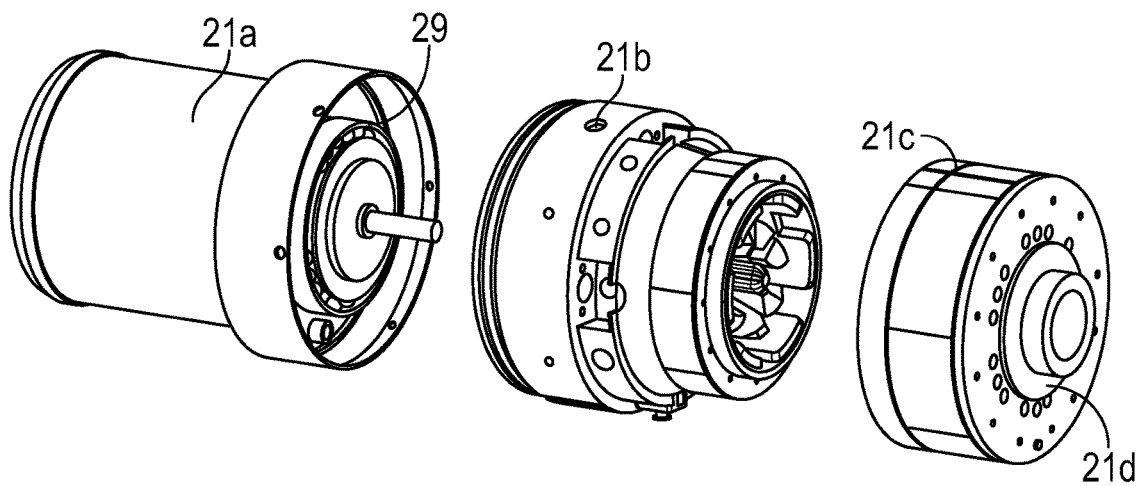
FIG. 2 is an exploded view in partial perspective of an exemplary embodiment of the claimed invention.

Referring additionally to FIG. 2, the power provided by tooling adapter 21*d* may comprise rotational power, hydraulic power, electrical power, or the like, or a combination thereof. The plurality of motors 220,221 (FIG. 1) may be adapted to allow driving both a torque tool latch function and the main rotational mechanism during operation of a rotational valve, all thru one interface such as tooling adapter 21*d*. The rotational ability of adaptive tooling interface 20 can also give specific tooling added function, as an example, a simple grip/jaw tool mounted in or on adaptive tooling interface 20 can be rotated to a vertical position to pick up debris on the seabed, without pitching subsea vehicle 2 (FIG. 13A) to which adaptive tooling interface 20 is mounted or integrated.

Referring additionally to FIG. 3, in embodiments, adaptive tooling interface 20 further comprises latch 209 and typically disposed at a portion of drive interface 21*c* such intermediate or as part of tooling adapter 21*d* and a portion of second housing section 21*b*. Latch 209 may comprise ball lock 214 paired with ball lock receiver 214*a*, a fin latch, a gripper, a power screw lock, a friction chuck, or the like, or a combination thereof.

In addition, adaptive tooling adapter 20 may comprise guide 26*a*, such as a portion of second housing section 21*b*, which can help align and drive interface 21*c* or dock tooling adapter 21*d* with tool 110 at guide receiver 26*b*. One or more identifiers, such as RFID 223, may be present to help allow controller 250 to know which tool 110 has been interfaced with tooling adapter 21*d*.

Figure 4A:
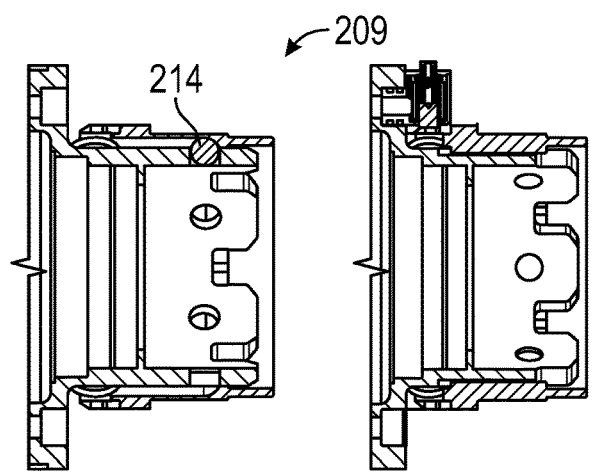
FIGS. 4A and 4B are cutaway views in partial perspective of an exemplary embodiment of a drive interface of the claimed invention illustrating a latch.
Figure 4B:
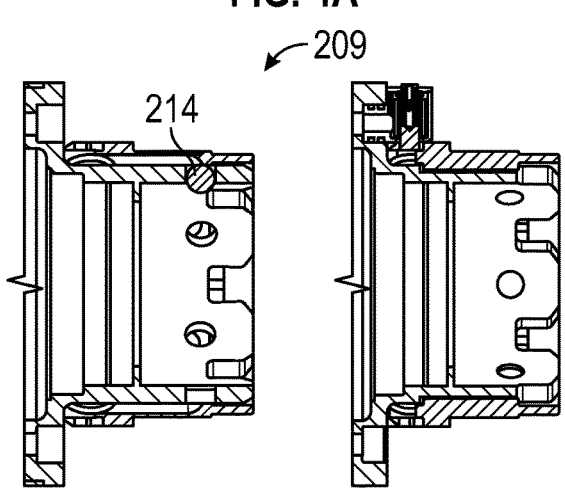
Figure 5:
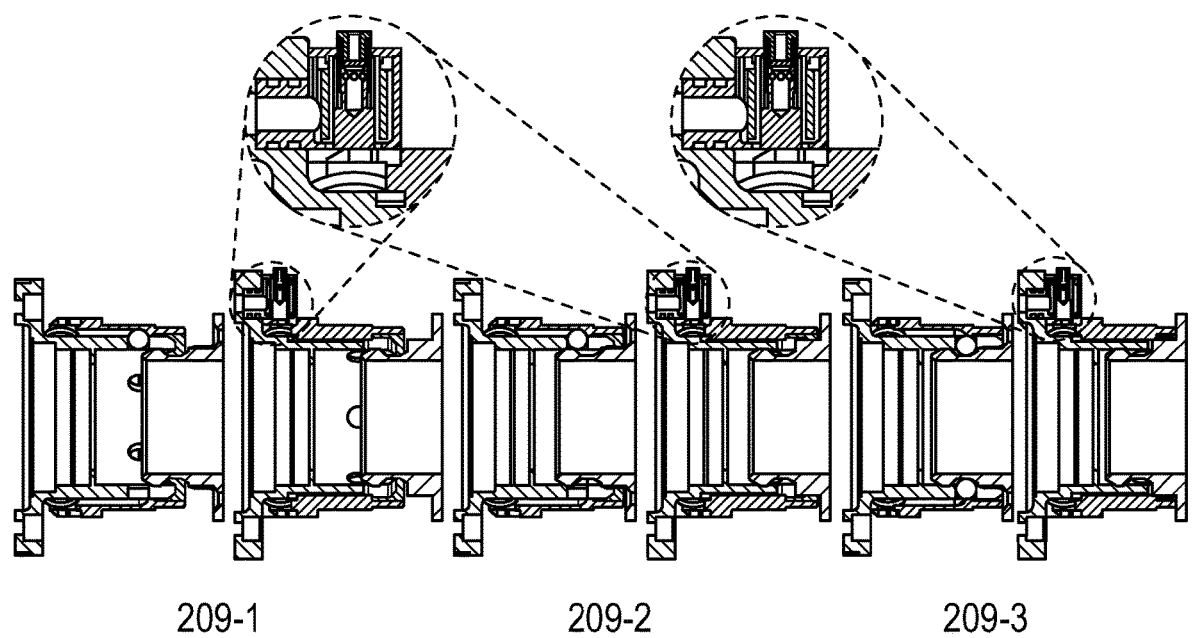
FIG. 5 is a cutaway view in partial perspective of an exemplary embodiment of a drive interface of the claimed invention illustrating operation of a latch.
Figure 6:
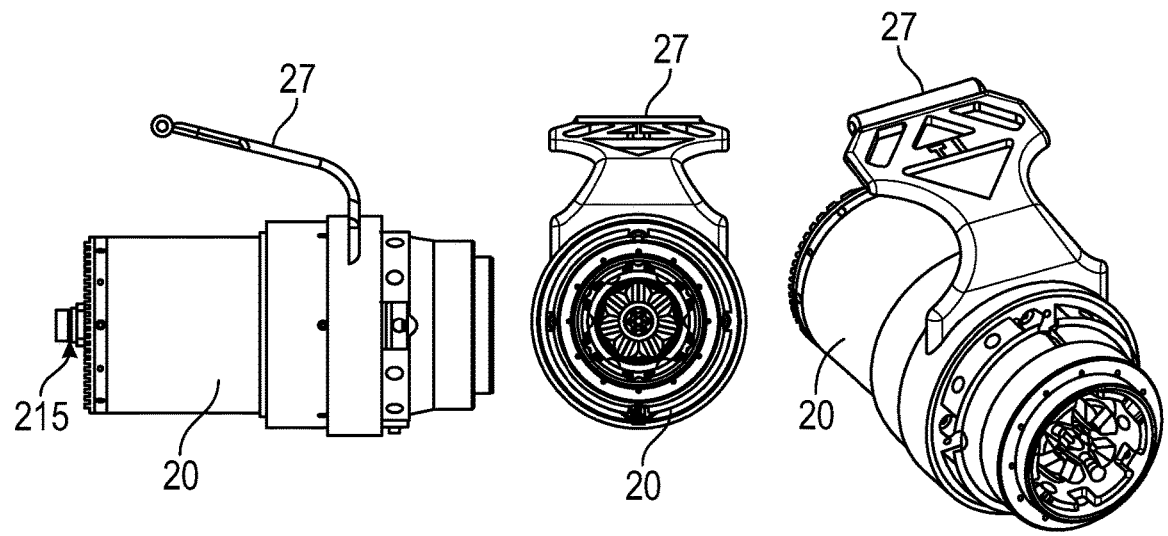
FIG. 6 is a cutaway view in partial perspective of an exemplary embodiment of the claimed invention.
Figure 7:
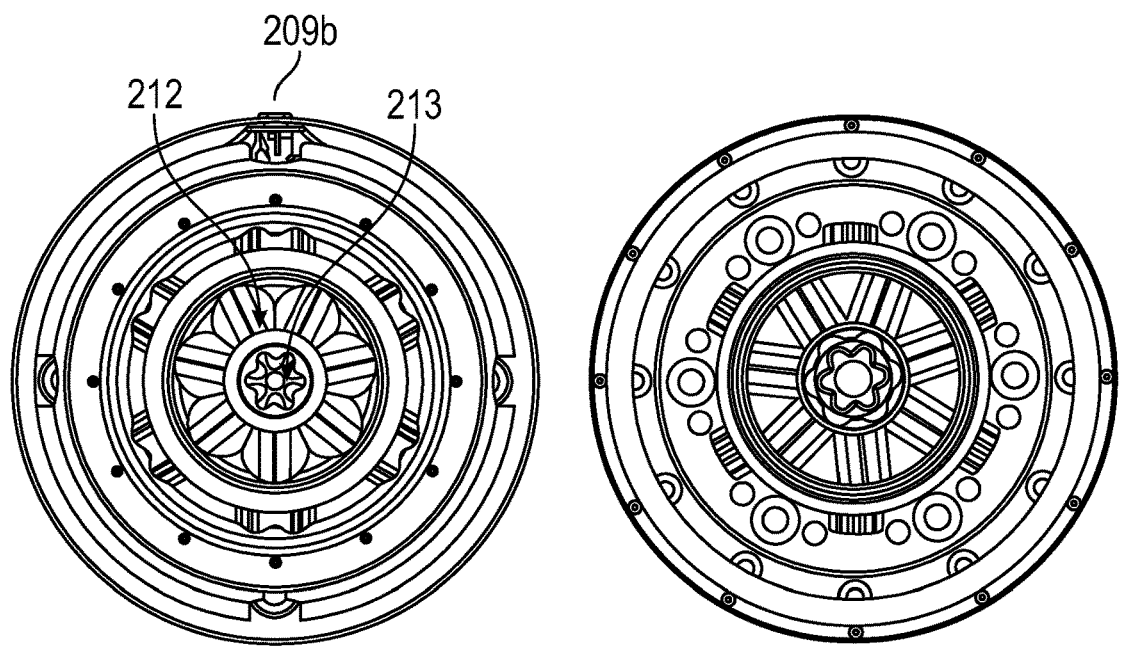
FIG. 7 is a cutaway view in partial perspective of an exemplary embodiment of a drive interface and tool interface of the claimed invention.

In one embodiment, operation of latch 209 uses ball lock 214 and ball lock receiver 214*a*. Referring now to FIGS. 4-6, an exemplary operation of ball lock 214 and ball lock receiver 214A are shown, where ball 214 may be in a unlatched mode (FIG. 4A) or a latched mode (FIG. 4B). A progression of latching is illustrated in FIG. 5, where latch 209 is shown in pre-aligned 209-1, engaging 209-2, and locked 209-3 positions.

Figure 16:
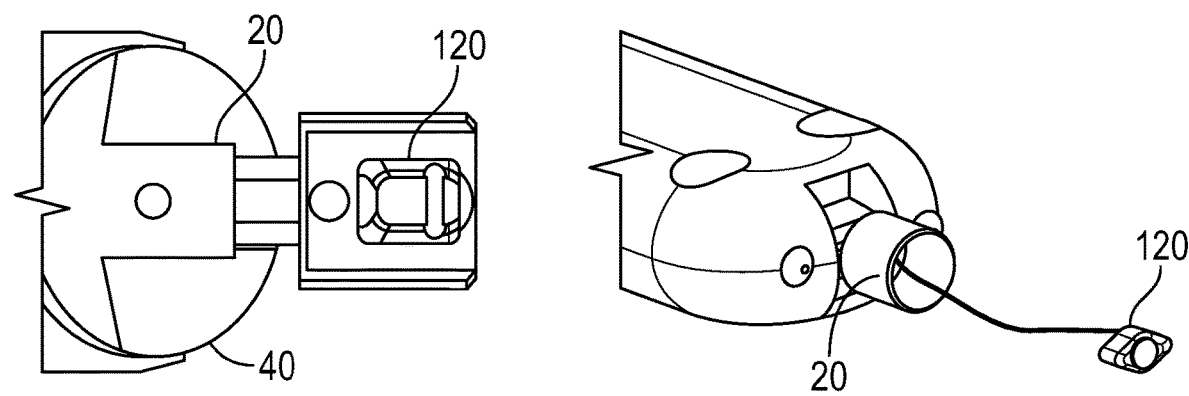
FIG. 16 is a block schematic diagram of a further exemplary embodiment of the system the claimed invention illustrating a housed drone.
Figure 17:
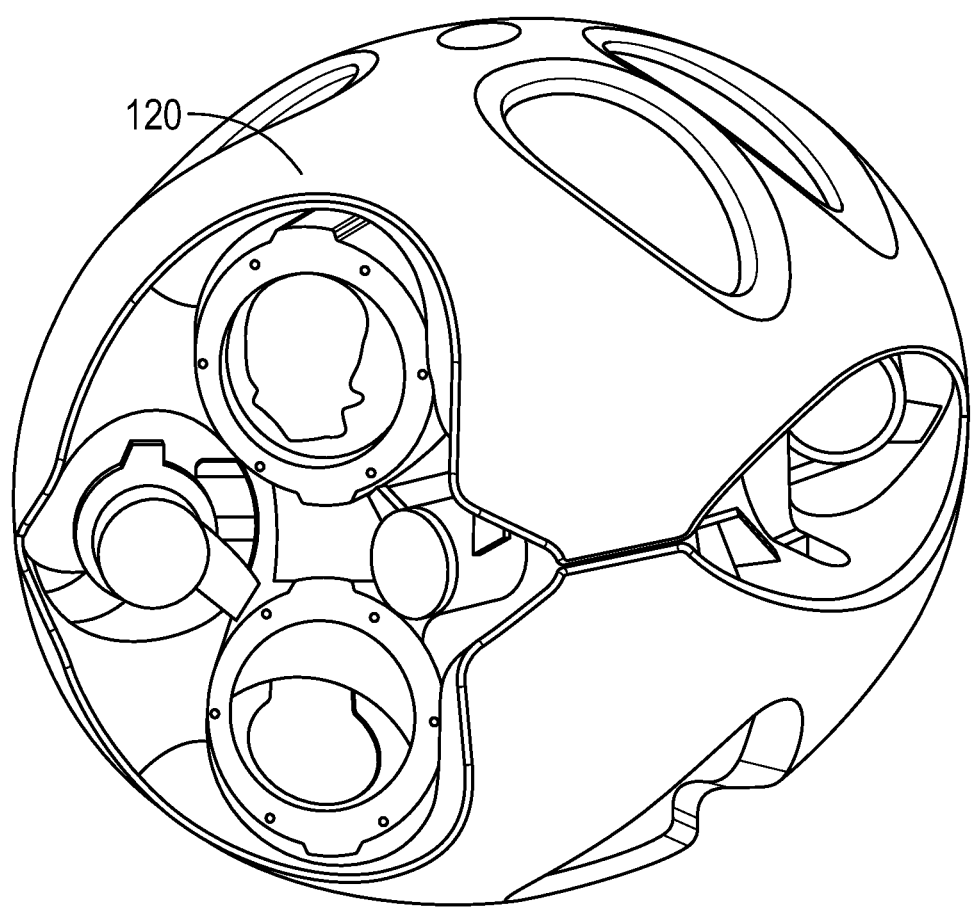
FIG. 17 is a view in partial perspective of a drone.

Typically, latch 209 is basic and only requires solenoid 209*b* to active ball 214 coupled with removing fluid to drive ball sleeve 210. To latch a device or vehicle to tool 110 adaptive tool interface 20 is typically inserted into tool 110 where it locks tool 110 using latch 209. In certain embodiments, adaptive tool interface 20 uses guide 26*a* when being inserted into guide receiver 26*a* of tool 110 to ensure initial alignment, and when inserted into tool 110 uses one or more fine alignment guides to ensure that ball-lock sleeve 210 is engaged to force ball 214 to engage an interface grove or channel of tool interface 21*c* such as at 210*a*. To hold on to tool 110 when adaptive tool interface 20 is withdrawn such as when a subsea device takes tool 110 with it, solenoid 209*b* needs to hold ball sleeve 210. In these embodiments, tool guide 26*a* pushes ball sleeve 210 which forces ball 214 down in a groove or channel of tool interface 21*c*, e.g. 210*a*. When fully entered, solenoid 209*b*, which may be spring loaded, falls down in to a hole in ball sleeve 210, thereby holding ball sleeve 210 back. In these embodiments, latch 209 operates substantially as an auto-lock latch which is all mechanical and solenoid 209*b* works as a basic spring loaded door lock, only needing power when tool 110 is docked. To un-dock adaptive tooling interface 20 from tool 110, a device such as a subsea vehicle or a manipulator holding adaptive tooling interface 20 can axially lock tool 110 on a further subsea device such as a subsea docking station or a tool rack such as by a friction lock or J-lock. When tool 110 is locked, it can subsequently be pushed or compressed to free solenoid 209*b* piston from ball sleeve 210 such as by using friction, after which power can be applied to solenoid 209*b* allowing adaptive tooling interface 20 to be pulled off tool 110. In some embodiments, this will be controlled using software at least partially operative in controller 250 or a subsea vehicle such as miniature tethered inspection remotely operated vehicle 120 (FIG. 16). If miniature tethered inspection remotely operated vehicle 120 needs to be able to dock autonomously, solenoid 209*b* may be powered before tool 110 is axially locked. In embodiments comprising miniature tethered inspection ROV 120, it may be selectively resident in a dockable unit which has the same interface as the rest of the AUV tooling. In these embodiments, miniature tethered inspection ROV 120, after being docked to adaptive tool interface 20, may be allowed to fly out from subsea vehicle 2 to perform its function.

Referring now to FIG. 6, in certain embodiments manipulator interface 27 may be connected to or otherwise integrated with adaptive tooling interface 20.

Figure 8:
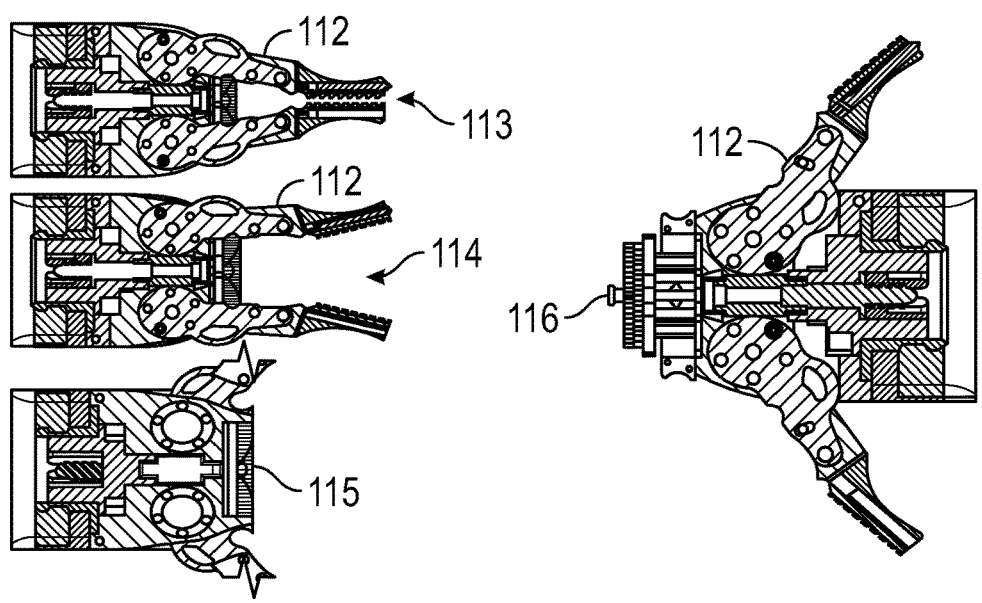
FIG. 8 are cutaway views in partial perspective of an exemplary embodiment of manipulator jaws of the claimed invention.

In certain embodiments, referring additionally to FIG. 8, adaptive tooling interface 20 (FIG. 1) may further comprise manipulator jaw 112 operatively connected to drive interface 21*c* (FIG. 1). Manipulator jaw 112 may further comprise brush tool 116, soft line cutter 115, cathodic protection probe 113, pipe grabber 114, or the like, or a combination thereof.

Figure 10:
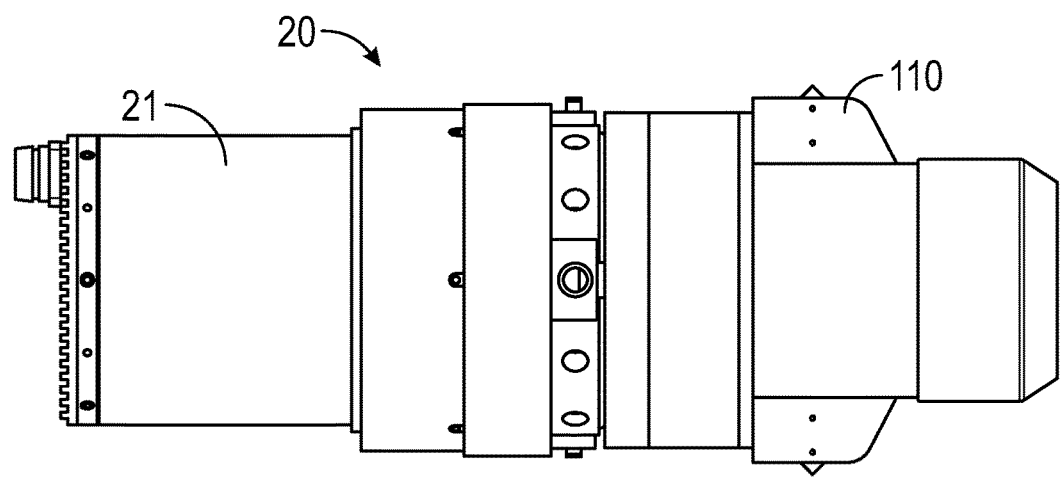
FIG. 10 is a view in partial perspective of an exemplary embodiment of the claimed invention attached to a tool.
Figure 11:
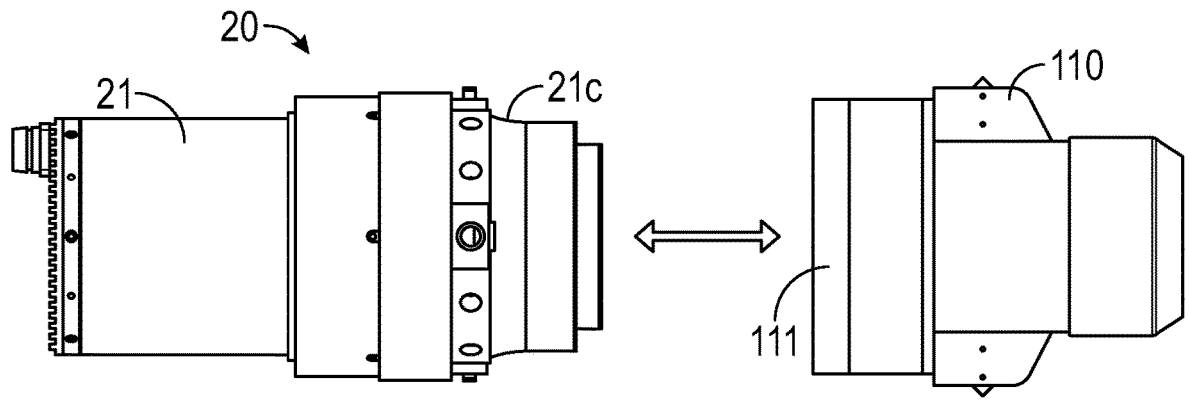
FIG. 11 is a view in partial perspective of an exemplary embodiment of the claimed invention detached from the tool.

FIG. 10 illustrates tool 110 connected to adaptive tooling interface 20 and FIG. 11 illustrates tool disconnected from adaptive tooling interface 20.

Figure 12:
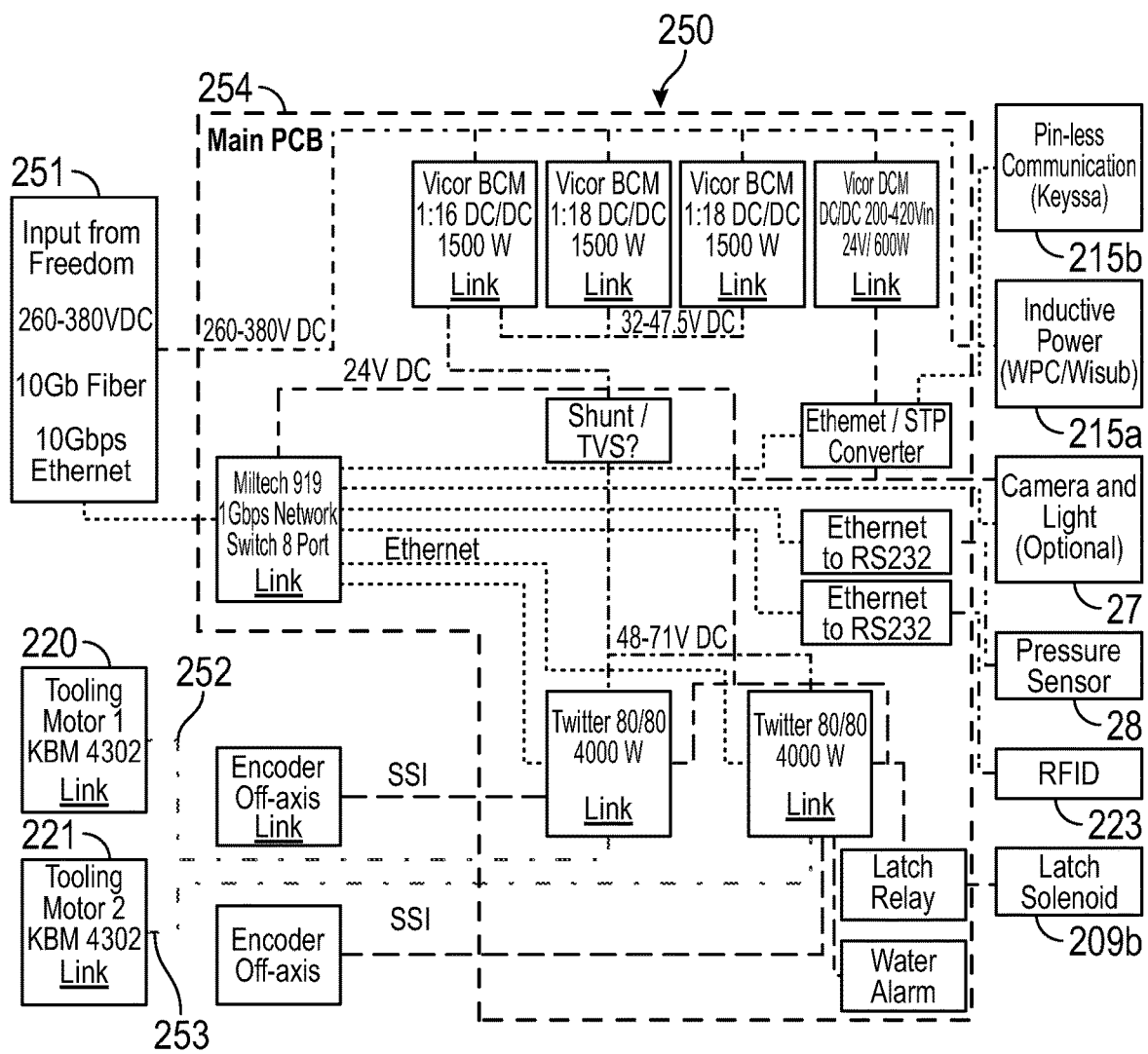
FIG. 12 is a block schematic diagram of an exemplary embodiment of a controller for the claimed invention.
Figure 15:
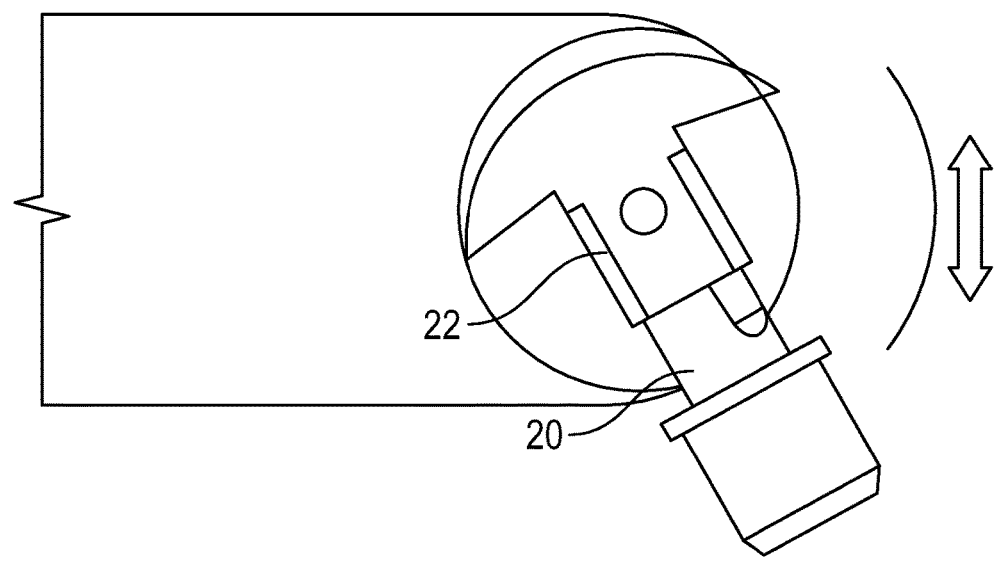
FIG. 15 is a detail illustrating the cover opened and the exemplary adaptive tool interface exposed to an externa environment and rotated.

In embodiments, referring to FIG. 12, controller 250 comprises one or more network interfaces 251 and one or more output data network pathways 252,253 operatively in communication with control circuitry 254. At least one network interface 251 is typically in communication with control circuitry 254 operatively in communication with the network interface. Controller 250 may be used to monitor mechanical and electrical output parameters such as RPM, position, torque, voltage, amperage, power consumption, water intrusion, and the like, or a combination thereof.

In such embodiments, control circuitry 254 may additionally be operatively in communication with power interface 215*a*. Further, if one or more communications interfaces 215*b* are present, control circuitry 254 may additionally be operatively in communication communications interface 215*b*.

In embodiments adaptive tooling interface 20 further comprises one or more balancing weights which may comprise a selectively detachable clump weight comprising a predetermined size and density.

Adaptive tooling interface 20 may further comprise a generation system which is adapted to generate power by converting mechanical power back to electric power. By way of example and not limitation, adaptive tooling interface 20 may use one or more of its motors 220,221 as generators to power or otherwise charge a subsea vehicle 2 (FIG. 13A) or equipment attached to adaptive tooling interface 20. By way of further example and not limitation, adaptive tooling interface 20 can drive an external motor to generate electrical power and provide that power such as over a tether to subsea vehicle 2, charging stationary equipment, or the like, or a combination thereof. By way of still further example and not limitation, adaptive tooling interface 20 can power a hydraulic or water based pump for fluid operated functions and use communications interface 215 to aid in effecting control of built in valves and/or read sensor data.

In embodiments, as opposed to using a plurality of motors 220,221, one motor 220 with two outputs 212,213 may be used along with a switch (not shown in the figures) comprising a gearbox or clutch solution (not shown in the figures). Alternatively, a single mechanical drive and pinless power transfer (not shown in the figures) may be used to enable two or more functions, especially as since pinless power and/or data communications can be used to provide more than one function.

Referring now to FIG. 13A, subsea vehicle system 1 comprises subsea vehicle 2 and first adaptive tool interface 20 rotatably disposed at least partially within vehicle housing 10 proximate the first end 11 where first adaptive tool interface 20 is as described above. First adaptive tool interface 20 can be mounted statically on subsea vehicle 2, integrated into subsea vehicle 2, or mounted to an actuator or conventional ROV manipulator with one or more axes of movement.

Subsea vehicle 2, which may be a remotely operated vehicle (ROV), an autonomous underwater vehicle (AUV), a subsea drone, a dredging vehicle, a subsea crawler, a hybrid underwater vehicle, a resident remotely operated vehicle, a skid, or the like, whether tethered or untethered, comprises vehicle housing 10 which comprises a first end 11 and a second end 12; first tool interface 40 at least partially disposed within vehicle housing 10 and defining a first void open to an external environment at first end 11 of vehicle housing 10. Subsea vehicle 2 is typically adapted for operating tooling to perform subsea intervention and may have one or more propulsion systems 13 to allow maneuvering subsea. Subsea vehicle 2 is further configured to be close to neutral in water with a pivot point disposed proximate a center of subsea vehicle 2 for optimal maneuverability, whereby tool 110 load in a far end 11 will have a large impact.

As illustrated in FIG. 13B, adaptive tool interface 20 is typically rotatably concealed in a first position and configured to be selectively commanded to rotate 180 degrees to align the interface for operation such as by exposing tooling adapter 21*d* to an external environment, e.g. a subsea environment, via the first void defined by first tool interface 40 via rotator 22 (FIG. 13B). In certain embodiments, first hydrodynamic shaped cover 41 is selectively positionable over first tool interface 40 such as via its own rotation mechanism or rotator 22. First hydrodynamic shaped cover 41 may be positioned during in flight mode to conceal adaptive tool interface 20 and, on command, rotate to allow adaptive tool interface 20 to be aligned for operation such as by rotation which may be concurrent or independent of the rotation of first hydrodynamic shaped cover 41. The "in flight" orientation of adaptive tool interface 20 coupled with the rotation of first hydrodynamic shaped cover 41 can reduce drag.

Additionally, subsea vehicle 2 may comprise a motor configured to allow rotation of adaptive tooling interface 20 and to provide pitch degree of freedom to tool 110.

In certain embodiments, as partially described above, first adaptive tool interface 20 further comprises an integrated balancing system adapted to make first adaptive tool interface 20 self-balancing and sufficient to provide for supporting first adaptive tool interface 20 for an added tool load in end 11 or 12 of vehicle housing 10 without the need for additional thruster support and increased power usage. This integrated balancing system typically further comprises one or more balancing weights as described above and control system 30 operative to allow a subsea vehicle to detach the clump weight when docking onto tool 110 to leave the center of gravity/pivot point unchanged.

In embodiments, first adaptive tool interface 20 further comprises a failsafe mechanism configured to allow subsea vehicle system 1 to disconnect and reconnect with tool 110 when tool 110 is operatively connected to adaptive tool interface 20 such as in the event of a tool or subsea vehicle failure. The failsafe mechanism may comprise latch 209, as described above, which may be spring loaded in an unlocked position and hydraulically energized into a locked position such that upon loss of power or hydraulic failure, latch 209 will fail to an unlatched position.

In most embodiments, tool 110 comprises a matching subsea tool tooling adapter 111 which is adapted to interface with tool 110 such as an intervention tool or manipulator jaw 112 (FIG. 8) which may be docked onto miniature tethered inspection remotely operated vehicle 120 (FIG. 16) or other device such as a subsea drone.

In certain embodiments, subsea vehicle 2 further comprises one or more additional tool interfaces 40, such as second tool interface 40, at least partially disposed within vehicle housing 10 where the second tool interface 40 defines a second void open to the external environment at second end 12 of vehicle housing 10, and a corresponding additional adaptive tool interface such as second adaptive tool interface 20 which is substantially identical to first adaptive tool interface 20 and which is rotatably disposed at least partially within vehicle housing 10, such as proximate to second end 12 of vehicle housing 10.

In contemplated embodiments, adaptive tool interface 20 can be fixed or otherwise integrated with a subsea asset or be configured as a standalone unit. By way of example and not limitation, this may include being fixed to a valve or used as a motor unit on a docking station tether management system (TMS). By way of further example and not limitation, adaptive tool interface 20 can be used to house a TMS and power the tether in and out for subsea vehicle system 1 to operate remotely as well as autonomously. In other contemplated embodiments, a TMS is configured as a standalone tool which can turn the mechanical power from adaptive tool interface 20 into spooling/hold-back functions while communications interface 215*b* from adaptive tool interface 20 provides data communications, thus allowing for a redundant TMS tool which is completely separated from adaptive tool interface 20.

In still other contemplated embodiments, adaptive tool interface 20 can be used as a propulsion motor such as for an underwater drone where one motor of the plurality of motors 220,221 drives a propeller and motor of the plurality of motors 220,221 may be used to adjust pitch.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. An adaptive tooling interface, comprising:
   a) a housing;
   b) a controller;
   c) a plurality of motors disposed at least partially within the housing and operatively in communication with the controller, a first motor of the plurality of motors comprising a high speed motor and a second motor of the plurality of motors comprising a high torque motor;
   d) a first power output operatively in communication with and configured to provide power from the first motor of the plurality of motors, the first power output comprising a speed output operatively in communication with the first motor;
   e) a second power output operatively in communication with and configured to provide power from the second motor of the plurality of motors, the second power output comprising a torque output operatively in communication with the second motor; and
   f) a drive interface comprising a tooling adapter operatively in communication with the plurality of motors and configured to mate with and to further provide power via the first power output and the second power output to a tool which comprises a matching subsea tool tooling interface.

2. The adaptive tooling interface of claim 1, wherein the housing comprises a first housing section and a separate second housing section mated to the first housing section.

3. The adaptive tooling interface of claim 1, wherein the plurality of motors is integrated in an in-line configuration.

4. The adaptive tooling interface of claim 1, wherein the power from the drive interface comprises rotational power.

5. The adaptive tooling interface of claim 1, wherein the power from the drive interface further comprises hydraulic power.

6. The adaptive tooling interface of claim 1, wherein the power from the drive interface further comprises electrical power.

7. The adaptive tooling interface of claim 1, wherein the controller is disposed at least partially within the housing.

8. The adaptive tooling interface of claim 1, wherein the controller comprises:
   a) a network interface;
   b) an output data network pathway; and
   c) control circuitry operatively in communication with the network interface and the output data network pathway.

9. The adaptive tooling interface of claim 1, further comprising:
   a) a power interface operatively in communication with the controller; and
   b) a communications interface operatively in communication with the controller.

10. The adaptive tooling interface of claim 9, wherein the controller comprises:
    a) a network interface;
    b) control circuitry operatively in communication with the network interface, the power interface, and the communications interface; and
    c) an output data network pathway operatively in communication with the control circuitry.

11. The adaptive tooling interface of claim 9, wherein the power interface further comprises a pinless power interface.

12. The adaptive tooling interface of claim 9, wherein the communications interface further comprises a pinless power interface.

13. The adaptive tooling interface of claim 1, wherein the drive interface further comprises a latch.

14. The adaptive tooling interface of claim 13, wherein the latch comprises a ball lock, a fin latch, a gripper, a power screw lock, or a friction chuck.

15. The adaptive tooling interface of claim 1, further comprising a manipulator jaw operatively connected to the drive interface.

16. The adaptive tooling interface of claim 15, wherein the manipulator jaw further comprises a brush tool, a soft line cutter, or a cathodic protection probe.

17. The adaptive tooling interface of claim 1, further comprising a balancing weight.

18. The adaptive tooling interface of claim 17, wherein the balancing weight comprises a selectively detachable clump weight comprising a predetermined size and density.

19. An adaptive tooling interface, comprising:
    a) a housing;
    b) a controller;
    c) a plurality of motors disposed at least partially within the housing and operatively in communication with the controller;
    d) a first power output operatively in communication with and configured to provide power from a first motor of the plurality of motors;
    e) a second power output operatively in communication with and configured to provide power from a second motor of the plurality of motors;
    f) a drive interface comprising a tooling adapter operatively in communication with the plurality of motors and configured to mate with and to further provide power via the first power output and the second power output to a tool which comprises a matching subsea tool tooling interface; and
    g) a manipulator jaw operatively connected to the drive interface, the manipulator jaw comprising a brush tool, a soft line cutter, or a cathodic protection probe.

* * * * *